(12) United States Patent
Leeds et al.

(10) Patent No.: US 9,245,027 B2
(45) Date of Patent: *Jan. 26, 2016

(54) SYSTEMS, COMPUTER-READABLE MEDIA, AND METHODS OF OPERATING A TARGET COMPUTER SYSTEM TO ANSWER A QUERY

(71) Applicant: IACS Search & Media, Inc., Oakland, CA (US)

(72) Inventors: Douglas D. Leeds, Danville, CA (US); Ummair Waheed, Pleasanton, CA (US); Jonathan M. Weinstock, Emeryville, CA (US)

(73) Assignee: IAC Search & Media, Inc., Oakland, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/043,350

(22) Filed: Oct. 1, 2013

(65) Prior Publication Data

US 2014/0032521 A1    Jan. 30, 2014

Related U.S. Application Data

(63) Continuation of application No. 13/177,492, filed on Jul. 6, 2011, now Pat. No. 8,548,970.

(51) Int. Cl.
G06F 17/30 (2006.01)
H04L 29/08 (2006.01)

(52) U.S. Cl.
CPC .... *G06F 17/30864* (2013.01); *G06F 17/30893* (2013.01); *H04L 67/02* (2013.01)

(58) Field of Classification Search
CPC .................. G06F 17/30864; G06F 17/30893; H04L 67/02

USPC .......................................... 707/706, 705, 769
See application file for complete search history.

(56) References Cited

U.S. PATENT DOCUMENTS

| | | | |
|---|---|---|---|
| 8,122,019 B2 | 2/2012 | Lucovsky et al. | |
| 8,201,081 B2 | 6/2012 | Stroe et al. | |
| 2007/0043583 A1* | 2/2007 | Davulcu | G06F 17/30864 705/1.1 |
| 2007/0198500 A1 | 8/2007 | Lucovsky et al. | |
| 2008/0294609 A1 | 11/2008 | Liu et al. | |
| 2009/0164929 A1 | 6/2009 | Chen et al. | |
| 2011/0010352 A1* | 1/2011 | Jockisch et al. | 707/706 |
| 2012/0191515 A1 | 7/2012 | Katz | |
| 2012/0233178 A1 | 9/2012 | Oztekin et al. | |
| 2012/0233530 A1 | 9/2012 | Stroe et al. | |

* cited by examiner

OTHER PUBLICATIONS url results with suggestion replace query—Google Scholar, http://scholar.google.com/scholar?q=url+results+with+suggestion+replace+query&hl=en&as_sdt+0%2C47[Nov. 4, 2012 3:56:01PM], Nov. 4, 2012.

*Primary Examiner* — Debbie Le
(74) *Attorney, Agent, or Firm* — Stephen M. De Klerk

(57) ABSTRACT

A query may be answered when a compound result URL including a target page identifier and the query is received at a target computer system. The target page identifier may be used to identify a target page on the target computer system. A call script may then be automatically executed and cause receipt of a plurality of suggestions based on the query by the target computer system. The suggestions may include a text of the suggestion and a suggestion URL. A placement script may then be automatically executed that, for example, places the text of each suggestion on the target page. The text of each suggestion may have an associated suggestion URL. Selection of the text of the suggestion may cause redirection of the user computer based on the suggestion URL.

9 Claims, 19 Drawing Sheets

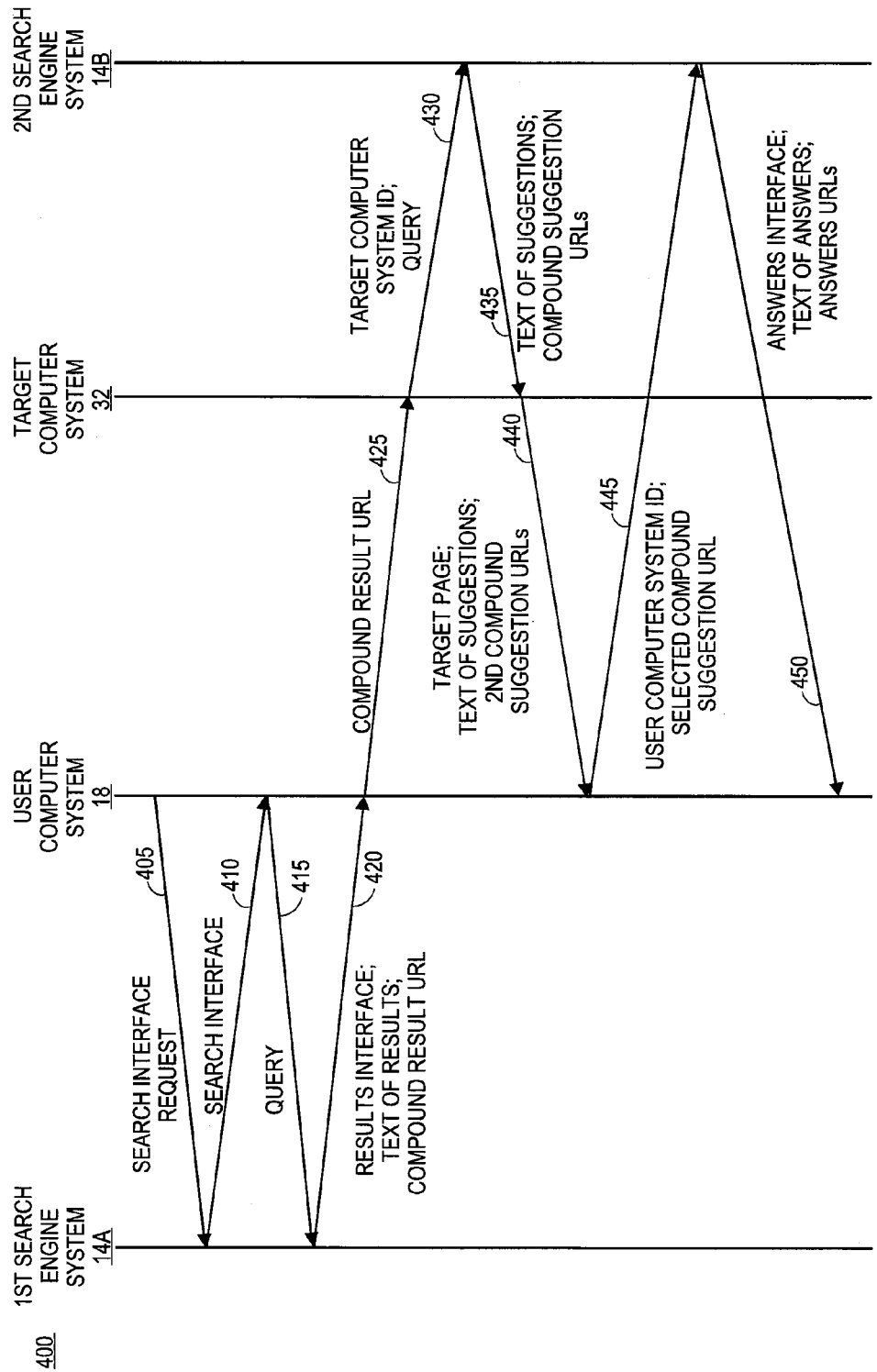

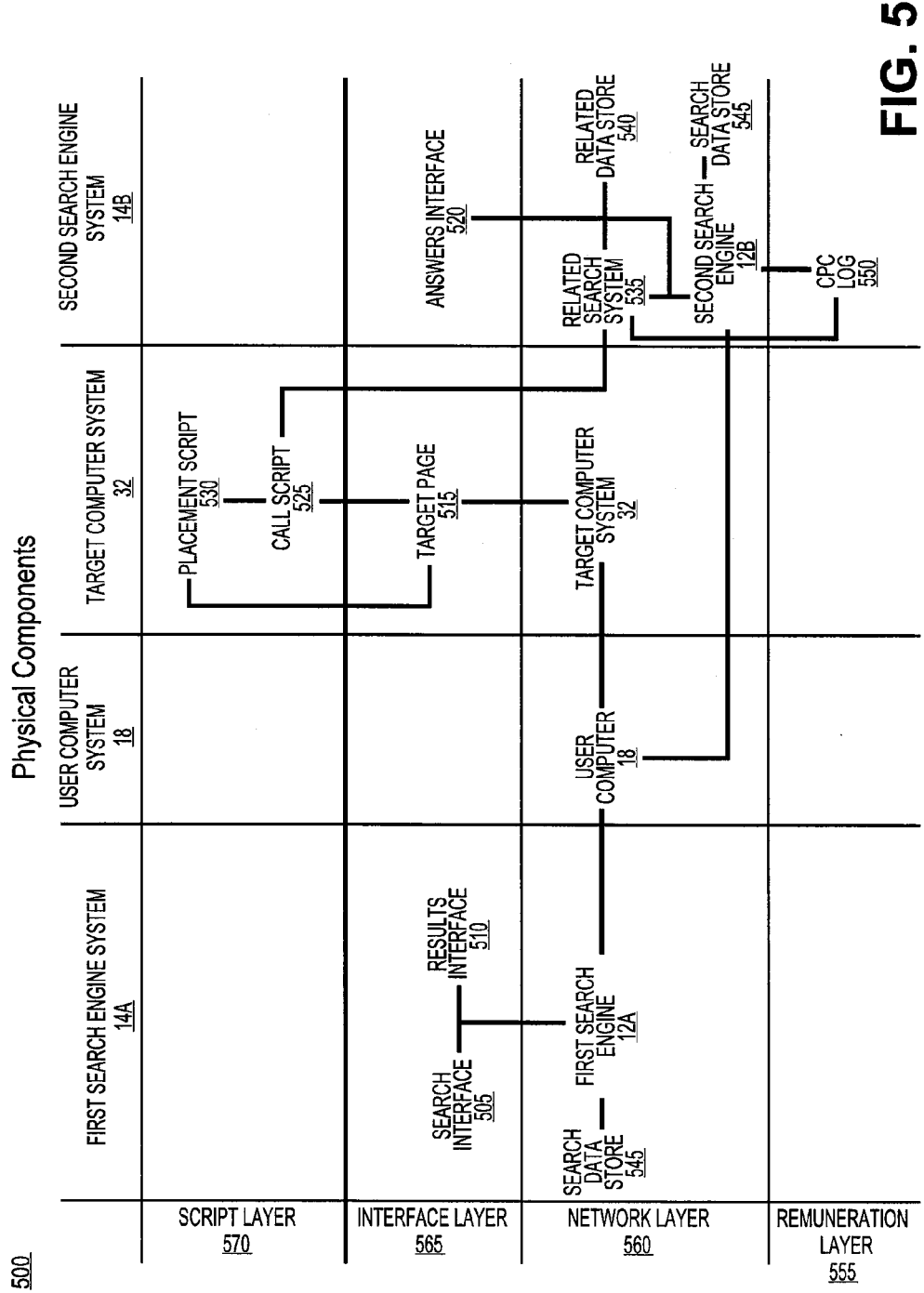

FIG. 8A

PeanutButterLovers.com

History of Peanut Butter

Although the peanut has a long history, having been found in Peruvian mummy tombs, peanut butter is a relatively young food.

In 1890, an enterprising physician, Dr. John Kellogg (of corn flakes fame), created peanut butter as a healthy protein substitute that was easy to digest for patients with no teeth. The manufacturing process was mechanized by George A. Bayle, Jr., and a patent for a peanut-butter machine was issued to Abrose W. Straub in 1903.

In 1904, peanut butter came into the limelight at the St. Louis Universal Exposition by concessionaire C. H. Sumner, where it was promoted as a health food.

When innovative agricultural scientist Dr. George Washington Carver developed an improved version of the butter, it attracted even more enthusiasts.

In 1922, peanut butter was commercially-born when J. L. Rosefield of Rosefield Packing Company of Alameda, California perfected a process to keep the oil from separating in the peanut butter along with spoilage prevention methods.

- History
- Supplies
- Recipes
- Top Meals
- Suggestions
- Store

Related Searches — 810
- Best Peanut Butter Cookie Recipe
- Easy Peanut Butter Cookie Recipe
- Skippy Peanut Butter
- Peanut Butter and Jelly Sandwich
- History of Peanut Butter
- Peanut Butter Jelly Time
- Peanut Butter Recall
- Jif Peanut Butter
- Best Peanut Butter Cake Recipe
- Bread
- Sugar Cookie Recipe
- George Washington Carver

Related Questions — 810
- What is the Recipe for the Magical Peanut Butter Milkshake?
- How to Make No Bake Cookies with Chocolate, Oatmeal, and Peanut Butter?
- Is Peanut Butter Healthy?
- What is Peanut Butter?
- Has Anybody Tried the SNICKERS/PEANUT BUTTER?
- What's You Favorite Way to Enjoy Peanut Butter?

SYSTEMS, COMPUTER-READABLE MEDIA, AND METHODS OF OPERATING A TARGET COMPUTER SYSTEM TO ANSWER A QUERY

CROSS-REFERENCE TO RELATED APPLICATIONS

This is a continuation of prior U.S. patent application Ser. No. 13/177,492, filed on Jul. 6, 2011, all of which is incorporated herein by reference in its entirety.

FIELD OF INVENTION

The present invention relates to methods, devices, and systems for operating a target computer system to answer a query.

BACKGROUND

The internet is often used to obtain information regarding businesses, events, movies, etc. in a specific geographic area. A user interface is typically stored on a server computer system and transmitted over the internet to a client computer system. The user interface typically has a search box for entering text. A user can then select a search button to transmit a search request from the client computer system to the server computer system. The server computer system then compares the text with data in a database or data source and extracts information based on the text from the database or data source. The information is then transmitted from the server computer system to the client computer system for display at the client computer system.

SUMMARY

Systems, computer-readable media, and methods of operating a target computer system to answer a query are herein disclosed. A compound result URL may be received at, for example, a target computer system. An exemplary compound result URL may include a target page identifier and a query.

When the compound result URL is received by, for example, a target computer system, the target page identifier included therein may be used to, for example, identify a target page on the target computer system. A call script may then be automatically executed by, for example, the target computer system and/or a user computer system. Execution of the call script may, for example, cause receipt of a plurality of suggestions based on the query by the target computer system. The suggestions may include, for example, a text of the suggestion and a suggestion URL. A placement script may then be automatically executed that, for example, places the text of each suggestion on the target page. The text of each suggestion may have, for example, an associated suggestion URL. Selection of the text of the suggestion may cause, for example, redirection of the user computer based on the suggestion URL.

In one embodiment, the target page may be transmitted from the target computer system to the user computer system. In some instances, the target page may be transmitted after execution of the placement script.

In another embodiment, a suggestion URL may include a compound suggestion URL that may, in turn, include, for example, a search engine identifier indicating a search engine system to receive the compound suggestion URL. The text of the suggestion may enable the search engine system to extract a plurality of answers from a database communicatively coupled to the search engine. The user computer system identifier of the user computer system with the compound URL may then be transmitted to the search engine transmitting the answers to the user computer system associated with the user computer system identifier. In some cases, the compound suggestion URL may include a target computer system identifier of the target computer system for use by the search engine system to credit an account corresponding to the target computer system identifier.

Exemplary target computer systems provided herein may include a processor, a storage medium connected to the processor, a network interface device connected to the processor, and a set of instructions on the storage medium and executable by the processor. The set of instructions may include, for example, a plurality of target pages, and a receiver that receives a compound URL over the network interface device. The compound URL may include a target page identifier and a query. The set of instructions may also include a target page identifier that, in response to receiving the content URL, utilizes the target page identifier to identify a target page among the plurality of target pages.

The set of instructions may further include a call script and a placement script. When executed the call script may automatically cause receipt of a plurality of suggestions based on the query. Each suggestion may include a text of the suggestion and a suggestion URL. The placement script may place the text of each suggestion on the target page. The text of each suggestion may have an associated suggestion URL wherein selection of the text of the suggestion causes redirection of the user computer based on the suggestion URL.

The set of instructions may also include a transmitter that transmits the target page together with the text of the suggestions thereon and the suggestion URLs associated with the text of the suggestion over the network interface device to the user computer system.

In some embodiments, each suggestion URL may be a compound suggestion URL that includes a search engine identifier of a search engine system for transmitting the compound suggestion for well to the text of suggestion for use by the search engine system to extract a plurality of answers. The transmitter may transmit a user computer system identifier of the user computer system with the compound URL and the search engine may transmit the answers to the user computer system associated with the user computer system identifier. In some cases, the compound suggestion URL may include a target computer system identifier of the target computer system that may be used by the search engine system to credit an account corresponding to the target computer system identifier.

In some embodiments, a computer system identifier and a query from a computer system utilizing the query to extract a plurality of compound suggestions based on the query may be received by, for example, a target computer system. Each compound suggestion may include the text of the suggestion and a compound suggestion URL. The compound suggestion URL may include, for example, a search engine identifier of the search engine system. The compound suggestions may be transmitted from, for example, the search engine system to a computer system having a computer system identifier.

One of the compound suggestion URLs and the user computer system identifier may be received from, for example, a user computer system following selection of the compound suggestion to use a computer system for directing the user computer system to the search engine due to the search engine identifier in the compound suggestion URL. The compound suggestion URL may be used to, for example, extract a plurality of answers and the answers may be transmitted to the user computer system having the user computer system identifier.

Systems, computer-readable media, and methods of operating a search engine system are also herein disclosed. A user computer system identifier and a query may be received at, for example, the search engine system from a user computer system.

The query may be used to, for example, extract a plurality of compound suggestions from a data store. Each compound suggestion may include, for example, text of the suggestion and a compound suggestion URL. The compound suggestion URL may include, for example, a search engine identifier of the search engine system. The compound suggestions may be transmitted from the search engine system to the user computer system associated with the user computer system identifier.

One of the compound suggestion URLs and the user computer system identifier may be received by the search engine system from the user computer system following selection of the compound suggestion. Selection of the compound suggestion may direct the user computer system to the search engine due to the search engine identifier included in the compound suggestion URL. The search engine may then use the compound suggestion URL to extract a plurality of answers from a data store. The answers may then be transmitted to the user computer system.

BRIEF DESCRIPTION OF THE DRAWINGS

The present invention is illustrated by way of example, and not limitation, in the figures of the accompanying drawings in which:

FIGS. 4A, 4B and 4C illustrate exemplary processes for answering a query, in accordance with embodiments of the present invention;

FIG. 5 is a grid depicting an exemplary process for answering a query, in accordance with embodiments of the present invention;

FIGS. 8A and 8B depict exemplary target pages, in accordance with embodiments of the present invention;

FIGS. 9A and 9B depict exemplary answers interface pages, in accordance with embodiments of the present invention;

FIG. 12 depicts exemplary answers interface page, in accordance with embodiments of the present invention.

Figure 1:
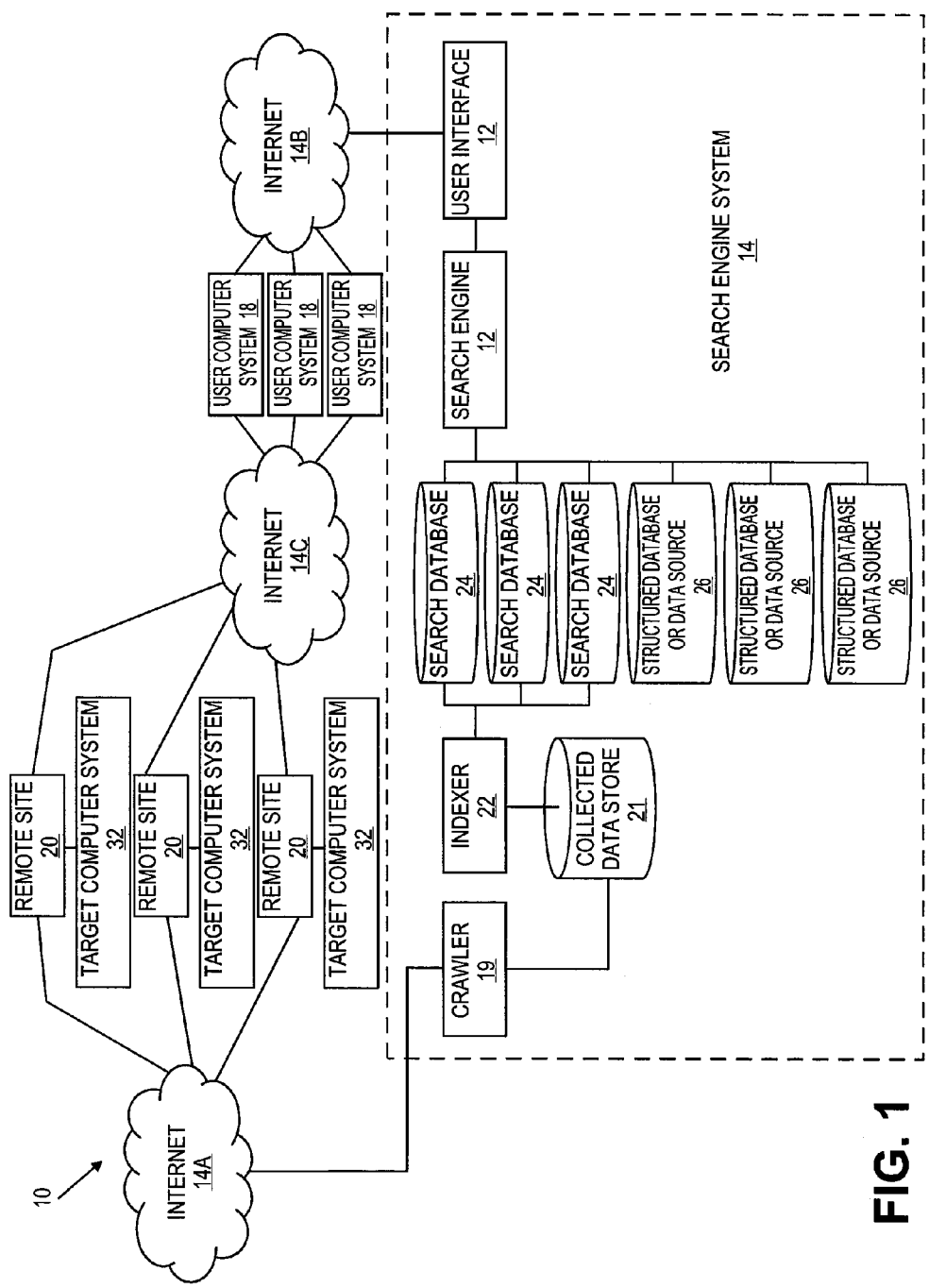
FIG. 1 is a block diagrams depicting exemplary network communication system, in accordance with embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

FIG. 1 of the accompanying drawings illustrates a network environment 10 that includes a user interface 12, the internet 14A, 14B, and 14C, a search engine system 14, a plurality of user computer systems 18, and a plurality of remote sites 20, according to an embodiment of the invention.

The search engine system 14 has stored thereon a crawler 19, a collected data store 21, an indexer 22, a plurality of search databases 24, a plurality of structured databases and data sources 26, a search engine 12, and a user interface 12.

The crawler 19 is connected over the Internet 14A to the remote sites 20. The remote sites 20 may be operated by one or more target computer systems 32. The collected data store 21 is connected to the crawler 19, and the indexer 22 is connected to the collected data store 21. The search databases 24 are connected to the indexer 22. The search engine 12 is connected to the search databases 24 and the structured databases and data sources 26. The user computer systems 18 are located at respective client sites and are connected over the Internet 14B and the user interface 12 to the search engine 12.

Figure 2:
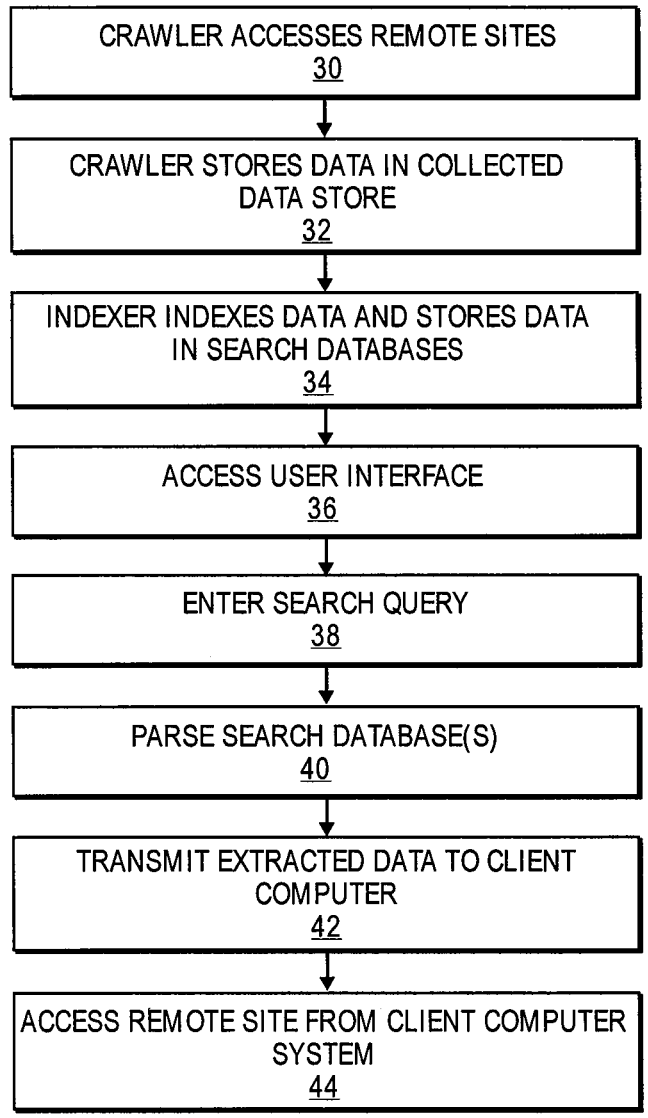
FIG. 2 is a flowchart depicting the functioning of a network communication system's, in accordance with embodiments of the present invention.

Reference is now made to FIGS. 1 and 2 in combination to describe the functioning of the network environment 10. The crawler 19 periodically accesses the remote sites 20 over the Internet 14A (step 30). The crawler 19 collects data from the remote sites 20 and stores the data in the collected data store 21 (step 32). The indexer 22 indexes the data in the collected data store 21 and stores the indexed data in the search databases 24 (step 34). The search databases 24 may, for example, be a "Web" database, a "News" database, a "Blogs & Feeds" database, an "Images" database, etc. Some of the structured databases or data sources 26 are licensed from third-party providers and may, for example, include an encyclopedia, a dictionary, maps, and/or a movies database, etc.

A user at one of the user computer systems 18 accesses the user interface 12 over the Internet 14B (step 36). The user can enter a search query in a search box in the user interface 12, and either hit "Enter" on a keyboard or select a "Search" button or a "Go" button of the user interface 12 (step 38). The search engine 12 then uses the "Search" query to parse the search databases 24 or the structured databases or data sources 26. When a "Web" search is conducted, the search engine 12 parses the search database 24 having general Internet Web data (step 40). Various technologies exist for comparing or using a search query to extract data from databases, as will be understood by a person skilled in the art.

The search engine 12 then transmits the extracted data over the Internet 14B to the user computer system 18 (step 42). The extracted data typically includes uniform resource locator (URL) links to one or more of the remote sites 20. The user at the user computer system 18 can select one of the links to one of the remote sites 20 and access the respective remote site 20 over the internet 14C (step 44). The search engine system 14 has thus assisted the user at the respective user computer system 18 to find or select one of the remote sites 20 that have data pertaining to the query entered by the user.

Figure 3:
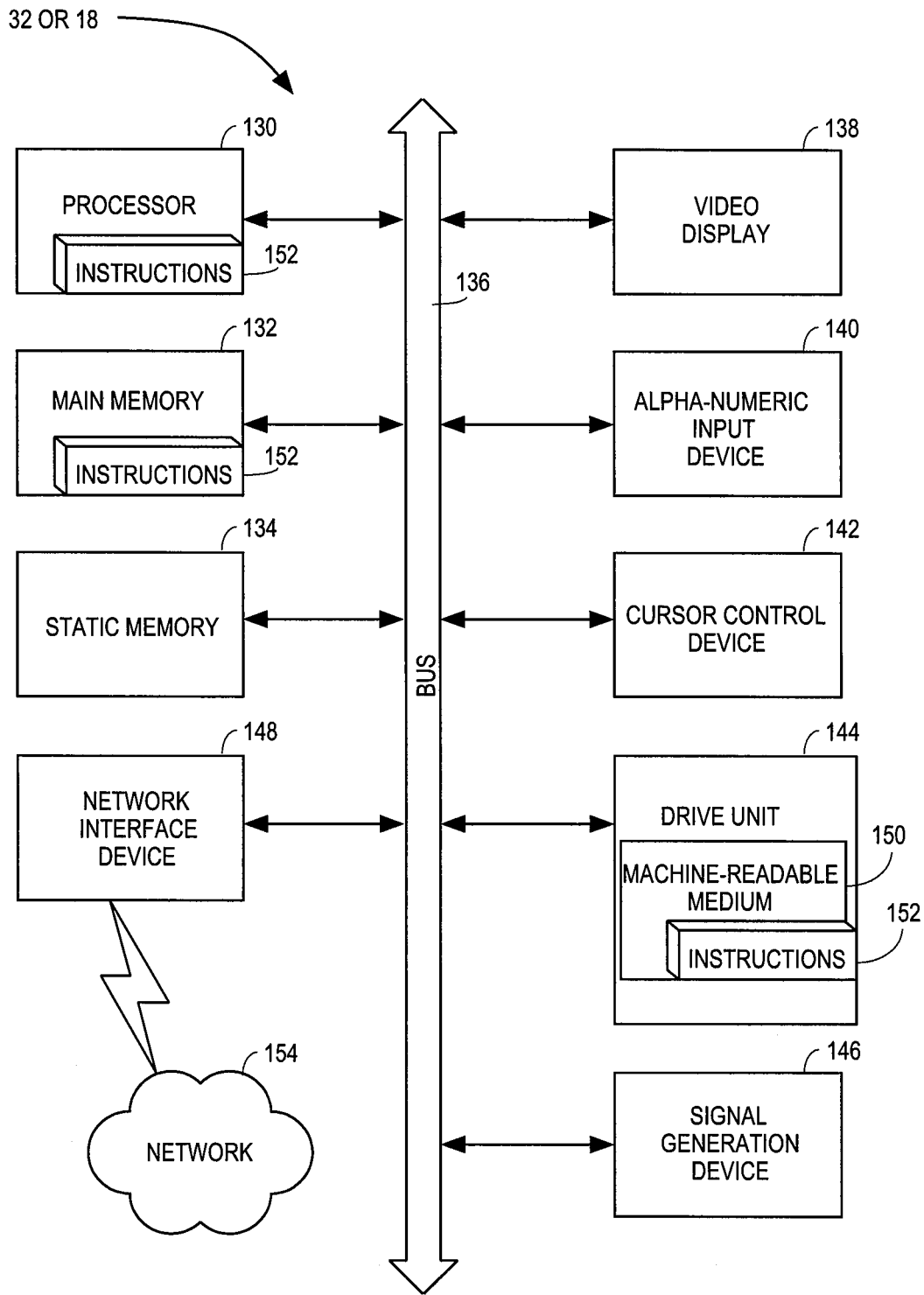
FIG. 3 is a block diagram depicting an exemplary target computer system and/or user computer system or, in accordance with embodiments of the present invention.

FIG. 3 shows a diagrammatic representation of a machine in the exemplary form of one of the target computer systems 32 and/or user computer systems 18 within which a set of instructions for causing the machine to perform any one or more of the methodologies discussed herein may be executed.

In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The search engine system 14 of FIG. 1 may also include one or more machines as shown in FIG. 3.

The exemplary user computer system 18 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM, etc.), which communicate with each other via a bus 136.

The user computer system 18 may further include a video display 138 (e.g., a liquid crystal display (LCD) or a cathode ray tube (CRT)). The user computer system 18 also includes an alphanumeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the user computer system 18, the memory 132 and the processor 130 also constituting machine-readable media. The software may further be transmitted or received over a network 154 via the network interface device 148.

While the instructions 152 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

FIG. 4A illustrates a first exemplary process 400 for answering a user query that may be executed by, for example, one or more systems or system components disclosed herein.

In step 405, user computer system 18 may request a search interface from a first search engine system 14A and the requested search interface may be returned to user computer system 18 via, for example, user interface 12 (step 410). User computer system 18 may then submit a query to first search engine system 14A (step 415) and a results interface may be transmitted to user computer system 18 (220). The results interface may include, for example, text of search results and a compound result URL. The compound result URL may include, for example, a target page identifier and the received query.

Upon selection of the text of the search result by user computer 18, the compound result URL associated with the selected search result may be transmitted to a target computer system 32 associated with the target page identifier included within the compound result URL (step 425). Next, target computer system 32 may communicate the query and a system identifier indicating target computer system 32 to a second search engine 14B (step 430).

Upon receipt of the target computer system identifier and the query, second search engine system 14B may determine one or more suggestions associated with the query and communicate text of at least one determined suggestion and at least one compound suggestion URL to target computer system 32 (step 435). Target computer system 32 may then prepare a target page including the text of the suggestion(s) and the compound suggestion URL(s) and transmit the target page to user computer system 18 (step 440).

Upon selection of a suggestion provided on the target page by user computer system 18, a system identifier indicating user computer system 18 and the compound suggestion URL associated with the selected suggestion may be communicated to second search engine 14B (step 445). Second search engine 14B may then prepare an answer interface including, for example, text of answers to a query associated with the selected suggestion and answer URLs and transmit the answer interface to the user computer system 18 (step 450).

Figure 4B:
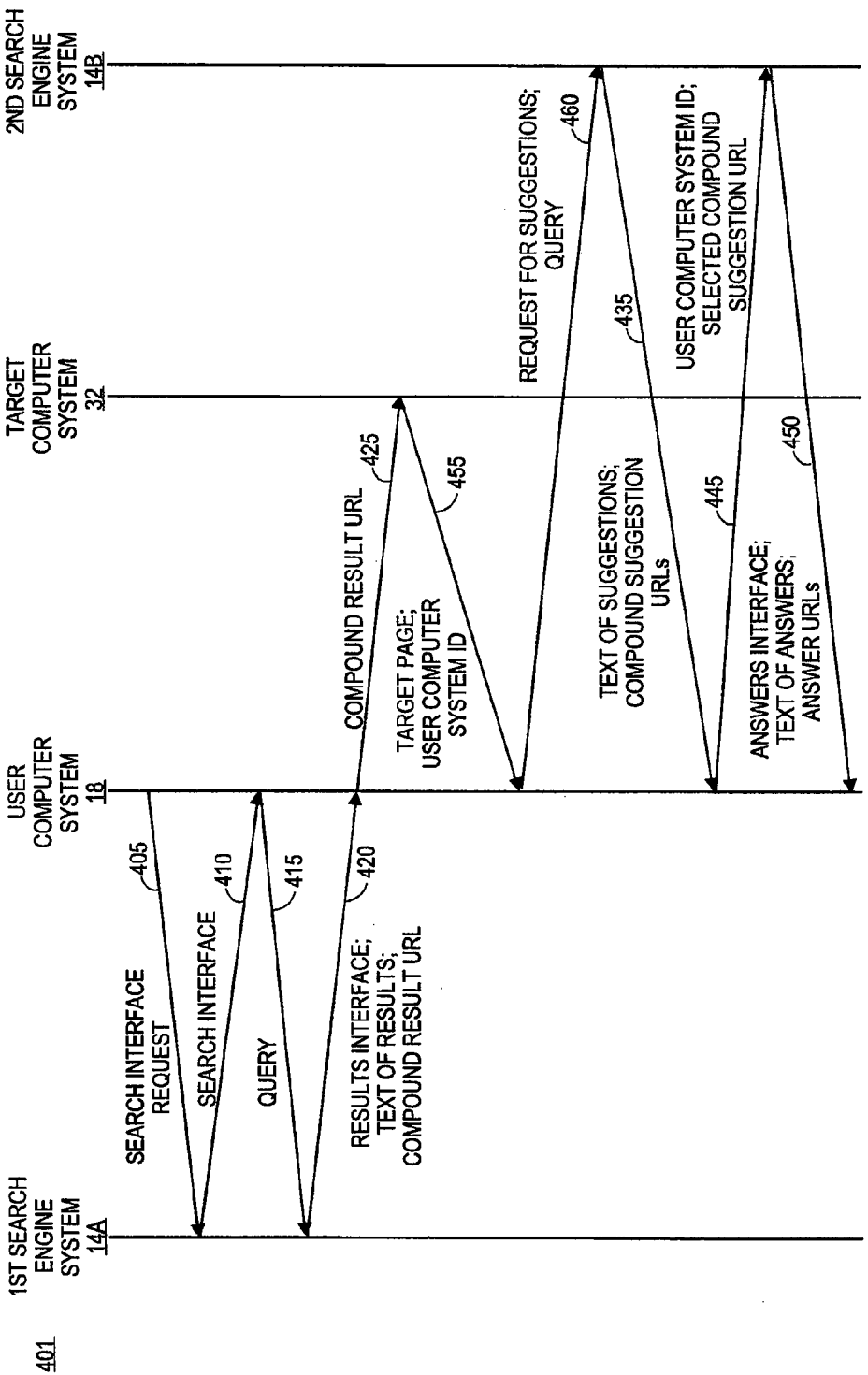

FIG. 4B illustrates a second exemplary process 401 for answering a user query that may be executed by, for example, one or more systems or system components disclosed herein. Execution of steps 405-425 is described above with regard to process 400 as depicted in FIG. 4A.

Following step 425, a target page corresponding to a selected URL and a user computer system ID may be communicated to the user computer system 18 (step 455). User computer system 18 may then transmit the query and a request for suggestions based upon the query to second search engine 14B (step 460). Second search engine 14B may then transmit text of suggestions and/or compound suggestion URLs (step 435) to user computer system 18. In some cases, the received suggestion text may be combined with the target page such that is displayed to a user as part of the target page. Following step 435, steps 445 and 450 as described above with regard to process 400 may be executed.

Figure 4C:
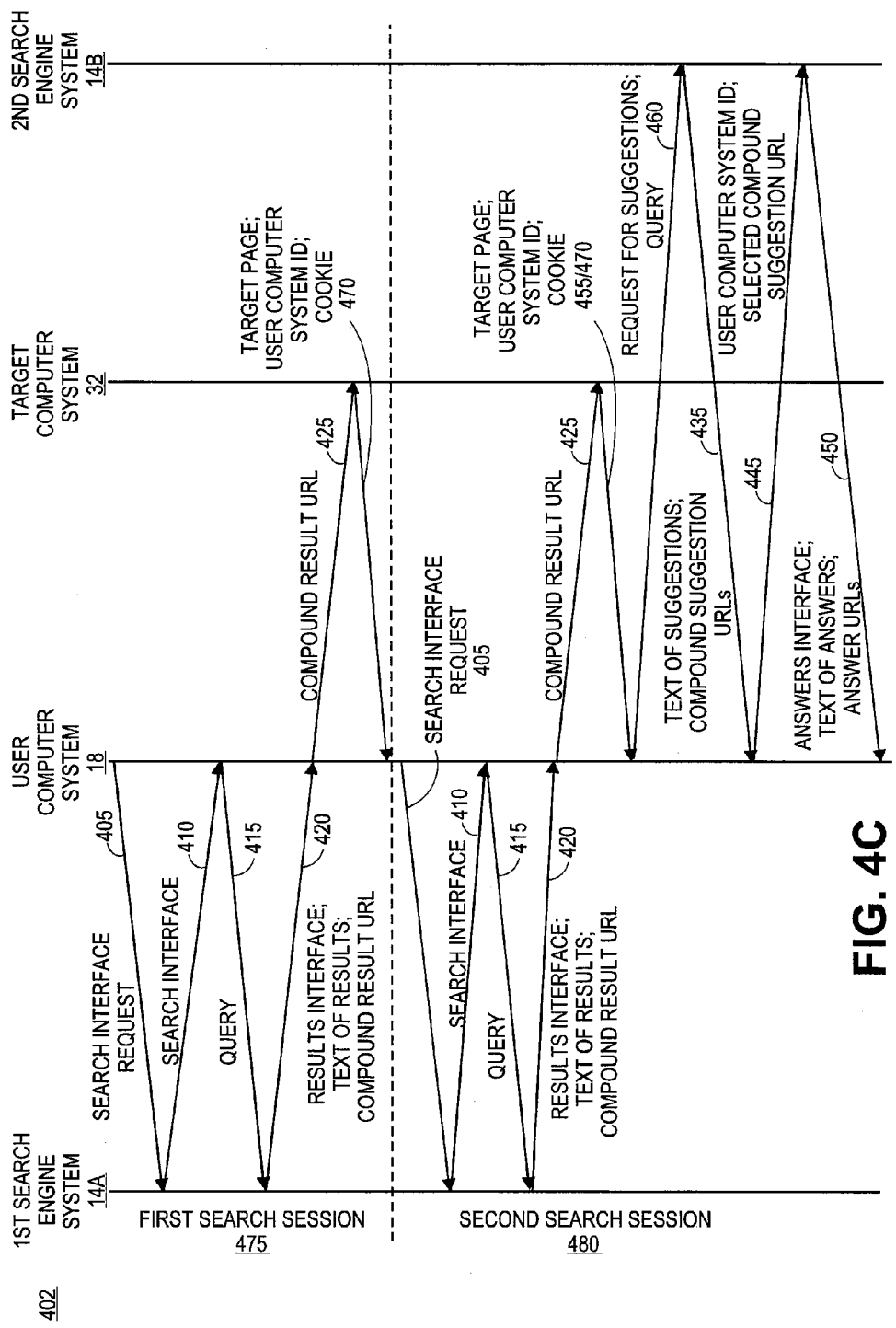

FIG. 4C illustrates a second exemplary process 402 for answering user queries that may be executed by, for example, one or more systems or system components disclosed herein. Execution of steps 405-425 is described above with regard to process 400 as depicted in FIG. 4A.

During a first search session 475, steps 405-425 may be executed. Following step 425, a target page corresponding to a selected URL, a user computer system ID, and a cookie may be communicated to the user computer system 18 from target computer system 32A (step 470). The cookie may be, for example, a HTTP cookie, a web cookie, and/or a browser cookie and may include instructions directing user computer system back to a particular target computer system 18, such as target computer system 32B, in order to request suggestions as in, for example, step 460, when a subsequent search is conducted by user computer system 18.

During a second search session 480, steps 405-425 may again be executed. Following step 425, a target page corresponding to a selected URL, and a user computer system ID, (step 455) or a target page corresponding to a selected URL, a user computer system ID, and a cookie may be communicated to the user computer system 18 (step 470). User computer system 18 may then transmit the query and a request for suggestions to second target computer system 32B indicated in the cookie sent to user computer system 18 during first search session 475 (step 460). The request for suggestions may, or may not, be related to the query.

Second target computer system 32B may then transmit text of suggestions and/or compound suggestion URLs to user computer system 18 (step 435). In some cases, the received suggestion text may be combined with the target page such that is displayed to a user as part of the target page. Following step 435, steps 445 and 450 as described above with regard to process 400 may be executed.

FIG. 5 is a grid 500 depicting relationships and interactions between various physical components and layers disclosed herein. The physical components included in grid 500 are a first search engine system 14A, user computer system 18, target computer system 32, and a second search engine system 14B. The layers included in grid 500 are a remuneration layer 555, a network layer 560, an interface layer 565, and a script layer 570. All steps discussed with regard to FIG. 5 relate to the steps of processes 400 and 401 as discussed above with regard to FIGS. 4A and 4B. It should be understood that the relationships and interactions between the components depicted in FIG. 5 are provided by way of example and not limitation.

User computer system 18 may communicate a search interface request to first search engine 12A as in step 405. First search engine 12A may then generate a search interface 505 and communicate search interface 505 to user computer 18, as in step 410. A query may then be communicated to first search engine 12A via user computer 18 as in step 415. First search engine 12A may then access a search data store 545 in order to locate search results matching the query and prepare and communicate a results interface 510 to user computer system 18. Results interface 510 may include, for example, text of one or more search results and one or more compound result URLs associated with respective ones of the text of search results. A compound result URL may include, for example, a target page identifier related to and/or providing a particular search result and the query. For example, a compound result URL may be "www.peanutbutterlovers.com+peanut butter" wherein "www.peanutbutterlovers.com" is the target page identifier provided by, for example, a remote site, such as remote site 20 and "peanut butter" is the query. Results interface 510 may then be communicated to user computer system 18 as in step 420.

User computer system 18 may then communicate a selection of a search result to a target computer system 32 indicated in, for example, the compound result URL associated with the selected search result as in step 425. Target computer system 32 may then prepare a target page 515 based on the received compound result URL. Target page 515 may include may include a call script 525 and a placement script 530.

In some embodiments, call script 525 may be may include a request for suggestions (e.g., questions, searches, and/or topics) related to the query and may be communicated by target computer system 32 and/or user computer system 18 to, for example, a related search system 535. Once received, related search system 535 may search for suggestions according to the call script via, for example, a related data store 340 second search engine 12B, and/or search data store 545. Related search system 535 and/or second search engine 12B may then prepare requested suggestions and transmit them to target computer system 32 as indicated in, for example, step 435. Each suggestion may include, for example, a text of the suggestion and a suggestion URL A placement script 530 may then be executed by target computer system 32 in order to place the text of each suggestion on a target page. The text of each suggestion may have an associated suggestion URL that may, or may not, be displayed upon the target page. In some cases, selection of the text of the suggestion may cause redirection of a user computer based on the suggestion URL to the second search engine system 14B and/or related search system 535 as in step 445 which may credit the target computer system for the user computer system's 18 selection of a particular suggestion via a cost per click (CPC) log 550 residing in remuneration layer 555.

Figure 6:
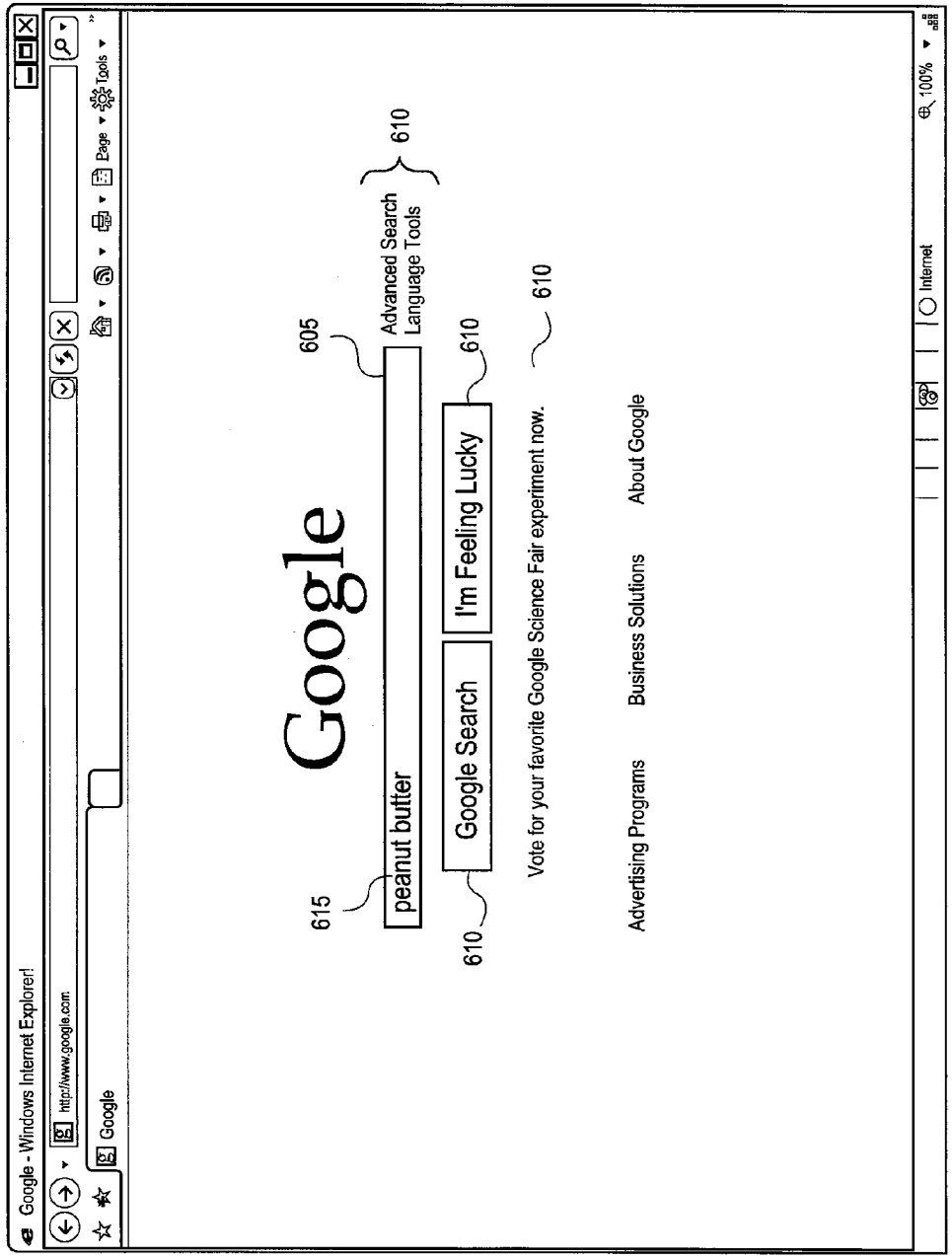
FIG. 6 is a screenshot depicting an exemplary search interface page, in accordance with embodiments of the present invention.
Figure 10:
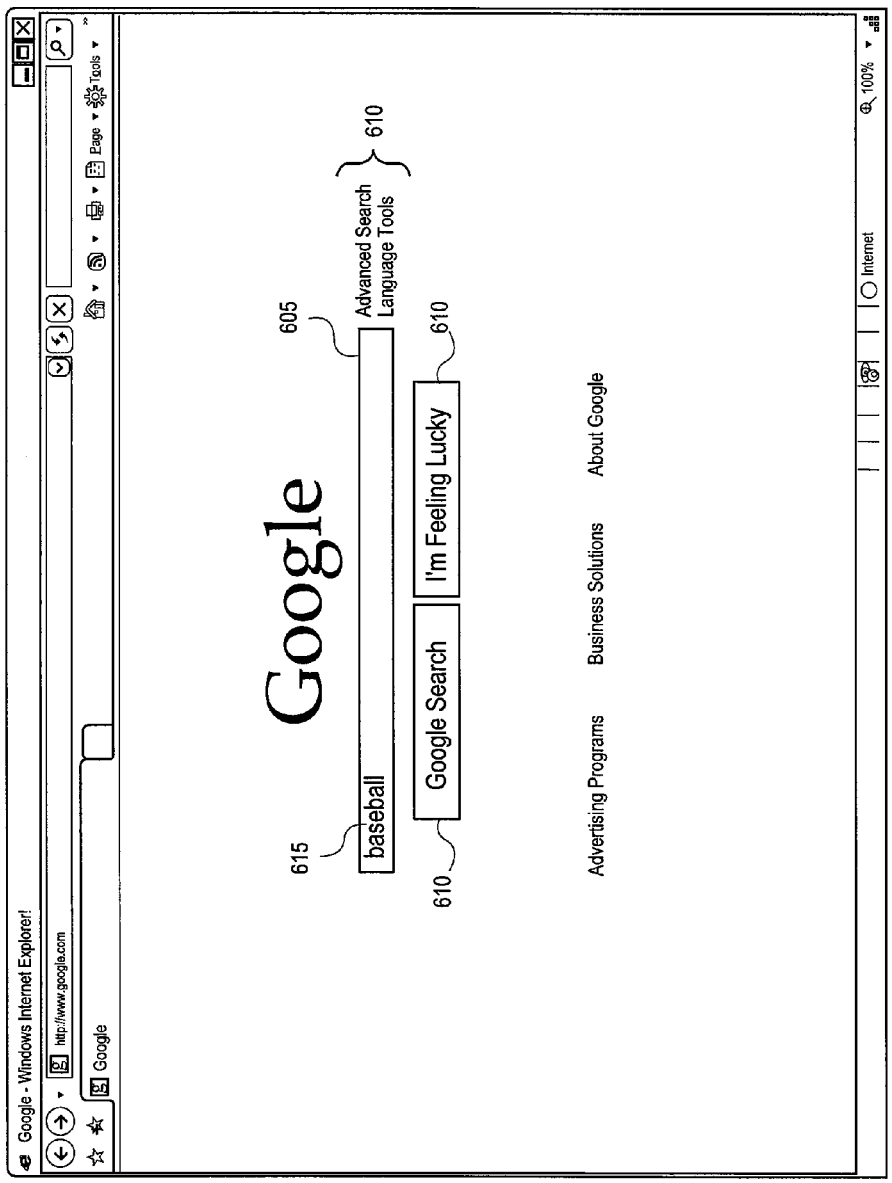
FIG. 10 depicts an exemplary results interface page, in accordance with embodiments of the present invention.

A search interface as discussed herein may be provided by any searching entity capable of conducting a search, such as search engines 12A and 12B and search engine systems 14A and 14B and may be provided to a user in any format. By way of example and not limitation, an exemplary search interface 505A and 505B are depicted in FIGS. 6 and 10, respectively. Exemplary search interface 505A includes a plurality of means by which a user may execute a query or search for information. For example, search interface 505A includes a dialog box 605 via which a user may enter a search query 615 (e.g., "peanut butter") and a plurality of selectable buttons 610 via which a user may choose to execute a query.

Once the search interface 505A is provided to a user computer system, such as user computer system 18, a user may communicate a query to a search engine by, for example, execution of step 415 as discussed above with regard to FIG. 4. The search engine may then prepare a results interface, such as results interface 510, in response to the received query and provide it to the user computer system in a manner similar to, for example, step 420 as discussed above with regard to FIG. 4.

Figure 7A:
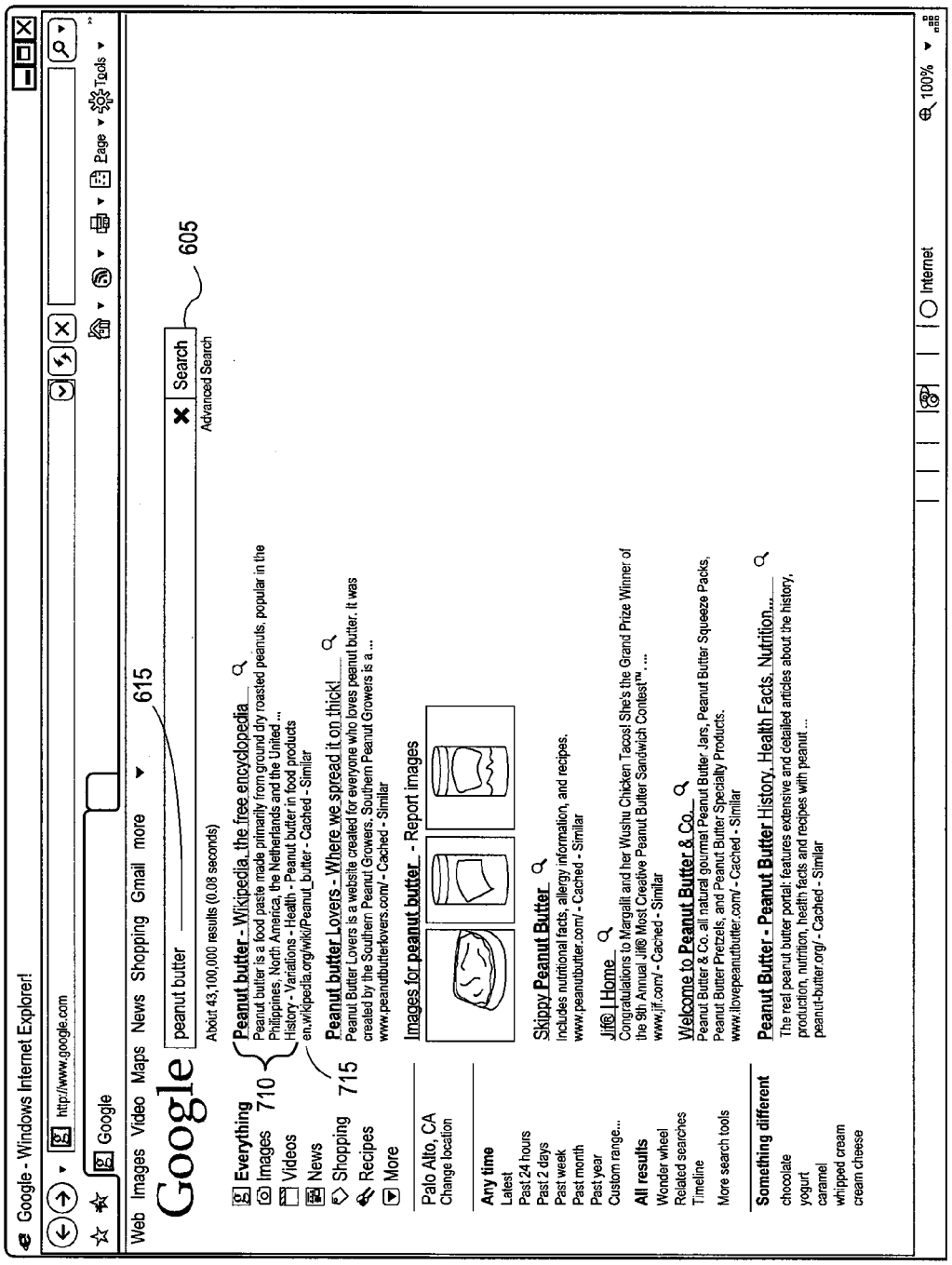
FIGS. 7A and 7B depict exemplary results interface pages, in accordance with embodiments of the present invention.
Figure 7B:
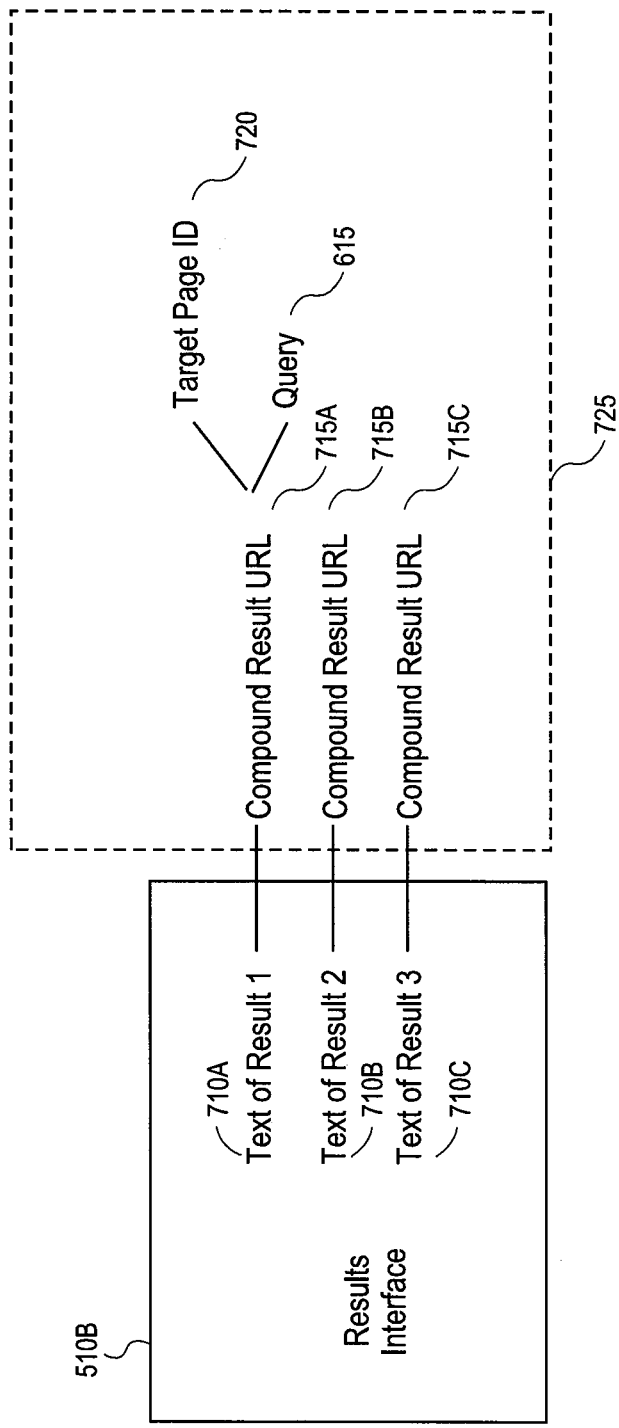

Exemplary results interfaces 510A and 510B are depicted in FIGS. 7A and 7B, respectively. Results interface 510A was prepared by, for example, a search engine system, such as search engine system 14A, in response to communication of a query 615 regarding "peanut butter," (the text of which can be seen in dialog box 605) to the search engine system. Exemplary results interface 510A includes search result text 710 associated with various search results and compound result URLs 715 associated with the text of various search results 710, respectively. A compound result URL 715 may include, for example, a URL indicating a location for a target page associated with a search result and the query, in this case "peanut butter." In some embodiments, a compound result URL 715 may resemble the compound result URL communicated between user computer system 18 and target computer system 32 in step 425 as discussed above with regard to FIG. 4.

FIG. 7B depicts another exemplary results interface 510B and results related information 725. Results related information 725 includes information related to the text of search results 710A-710C but is not necessarily displayed on results interface 510B.

Each text of result 701A-C is associated with a compound result URL. For example, text of result 710A is associated with a compound result URL 715A, text of result 710B is associated with a compound result URL 715B, and text of result 710C is associated with a compound result URL 715C.

For example, compound result URL 715A may include a target page identifier 720A and query 615, compound result URL 715B may include a target page identifier 720B and query 615, and compound result URL 715C may include a target page identifier 720C and query 615. Additionally, each compound result URL may include and/or be associated with a target page identifier 720 and a query 615. In some cases, the query may be the original query received by the search engine, which, in this case, is "peanut butter."

FIG. 8A depicts an exemplary target page 515A displayed to a user upon selection of a result text 710 and/or a result URL 715 as displayed on, for example, results interface 510A and/or 510B. For example, the particular target page 515A provided in FIG. 8A is displayed to a user upon their selection of the second search result displayed on results interface 510A (i.e., "peanutbutterlovers.com").

Exemplary target page 515A may be provided to, for example, a user computer system, such as user computer system 18, when selection of a compound result URL is received by a target computer system, such as target computer system 32, from the computer system as in step 425 as discussed above with regard to FIG. 4. In response to receiving the selected compound result URL, target page 515A including text of suggested searches 810 and compound suggestion URLs (not shown) may be provided to the user computer as in step 440 as discussed above with regard to FIG. 4. Exemplary suggested searches 810 include related searches and related questions.

Figure 8B:
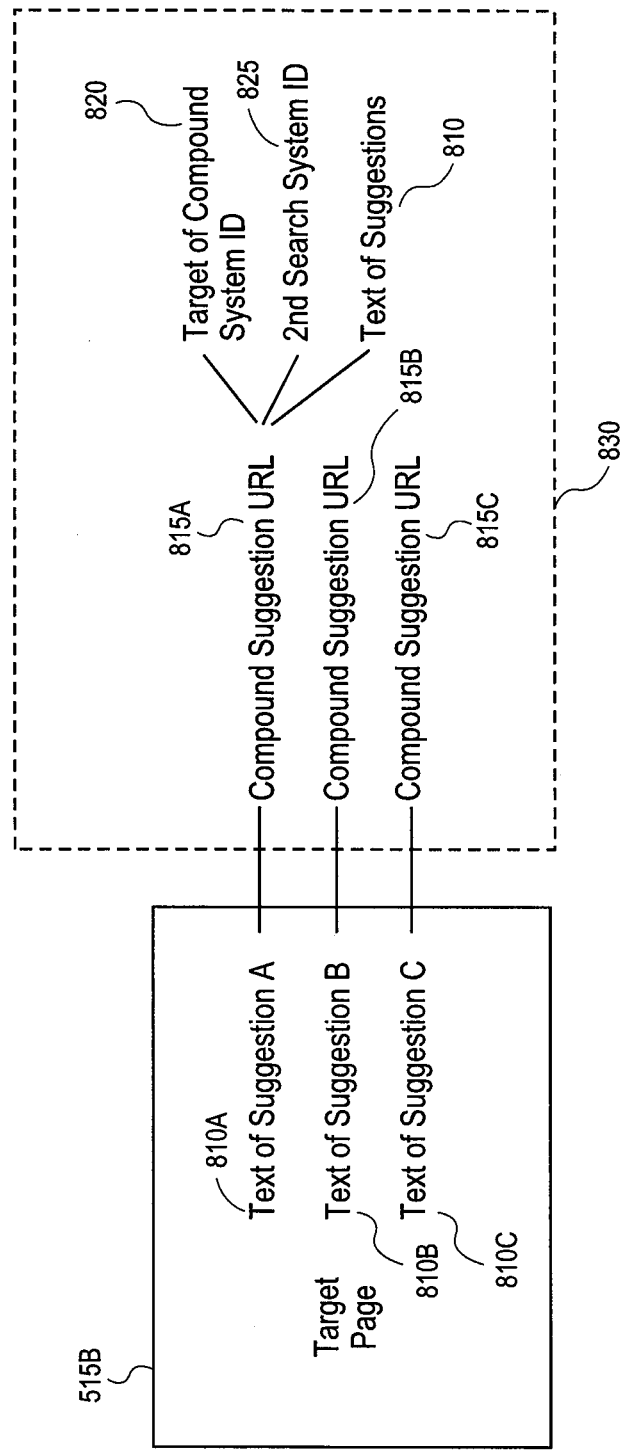

FIG. 8B is a block diagram depicting an exemplary target page 515B and suggestion related information 830. Suggestion related information 830 includes information related to individual suggestions displayed on target page 515B but not necessarily displayed thereon.

Exemplary target page 515B includes a text of suggestion 810A, a text of suggestion 810B, and a text of suggestion 810C. Each text of suggestion 810A-C may be associated with a compound suggestion URL. For example, text of suggestion 810A is associated with a compound suggestion URL 815A, text of suggestion 810B is associated with a compound suggestion URL 815B, and text of suggestion 810C is associated with a compound suggestion URL 815C. Additionally, each compound suggestion URL 815A-C may include and/or be associated with a target computer system identifier 820, a second search system identifier 825, and a text of suggestion 810.

Figure 9A:
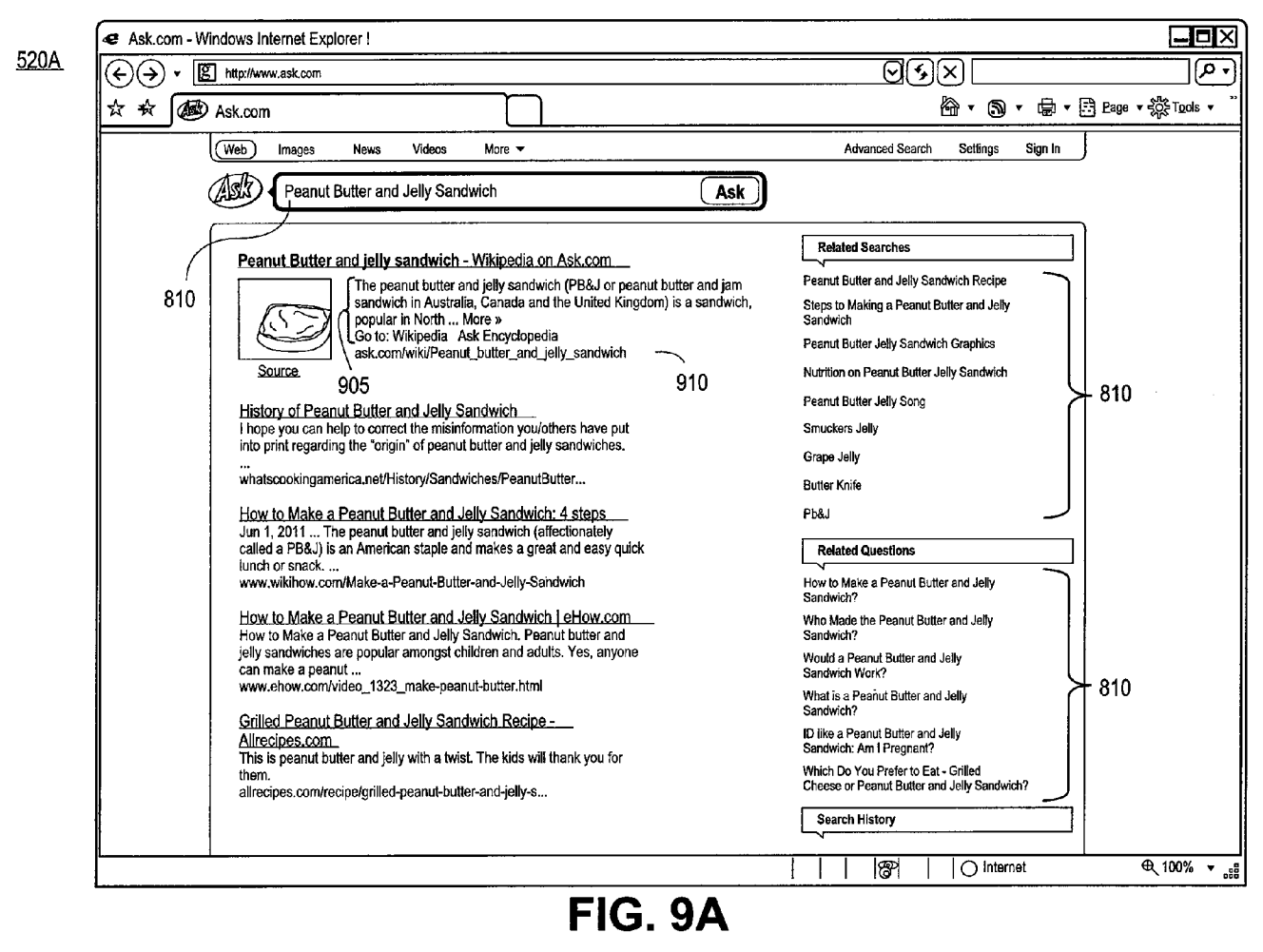

FIG. 9A depicts an exemplary answers interface 520A displayed to a user upon selection of a suggestion text 810 as displayed on, for example, target page 515A and/or 515B. For example, the particular answer interface 520A provided in FIG. 9A is displayed to a user upon their selection of the fourth suggestion displayed on target page 515A (i.e., "Peanut Butter and Jelly Sandwich"). Answers interface page 520A may be provided by, for example, a second search engine system, such as second search engine system 14B.

Answers interface 520A may include, for example, text of a suggestion 810, text of an answer 905 and an answer URL 910. Selection of answer URL 910 may direct a user to a target computer system, such as target computer system 32 associated with the selected answer URL 910.

Figure 9B:
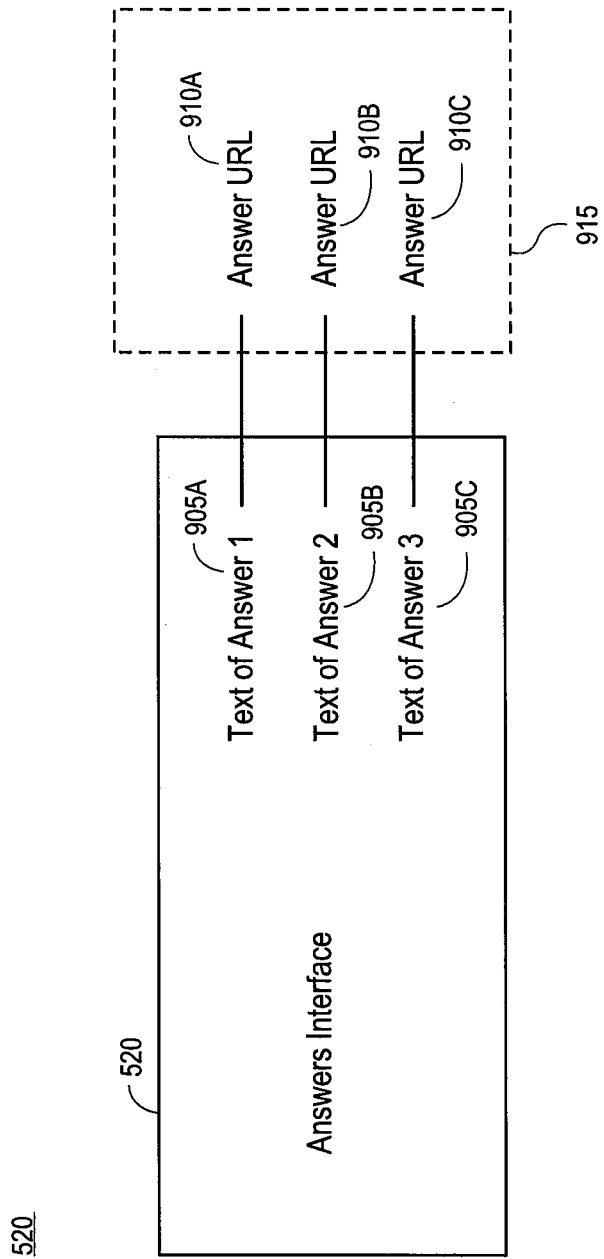

FIG. 9B is a block diagram depicting an exemplary answers interface 520B and answer related information 915. Answer related information 915 includes information related to individual answers displayed on answers interface 320B but not necessarily displayed thereon.

Exemplary answers interface 520B includes a text of answer 905A, a text of answer 905B, and a text of answer 905C. Each text of answer 905A-C is associated with an answer URL 910. For example, text of answer 905A is associated with an answer URL 910A, text of answer 905B is associated with an answer URL 910B, and text of answer 905C is associated with an answer URL 910C.

Figure 11:
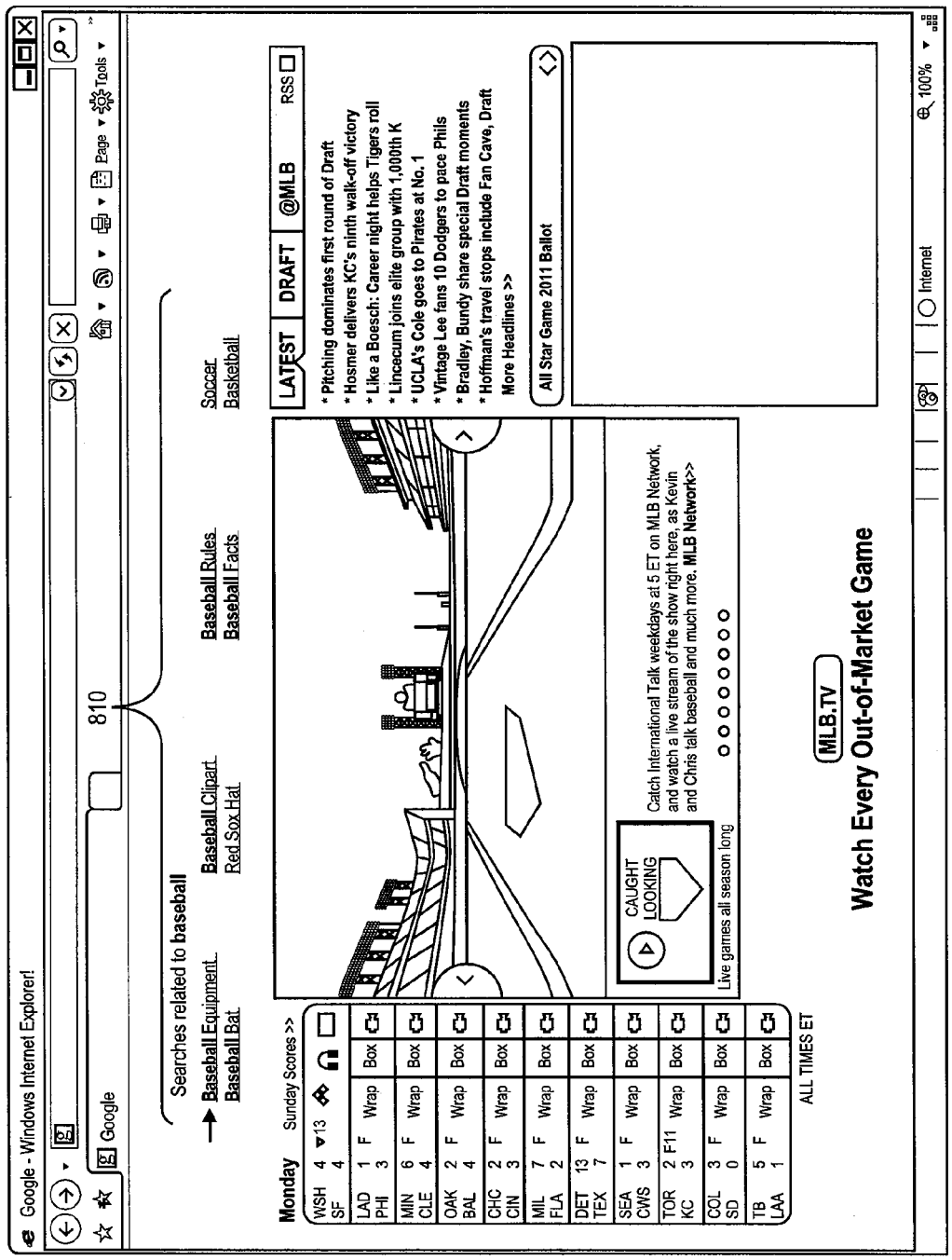
FIG. 11 depicts an exemplary target page, in accordance with embodiments of the present invention.
Figure 12:
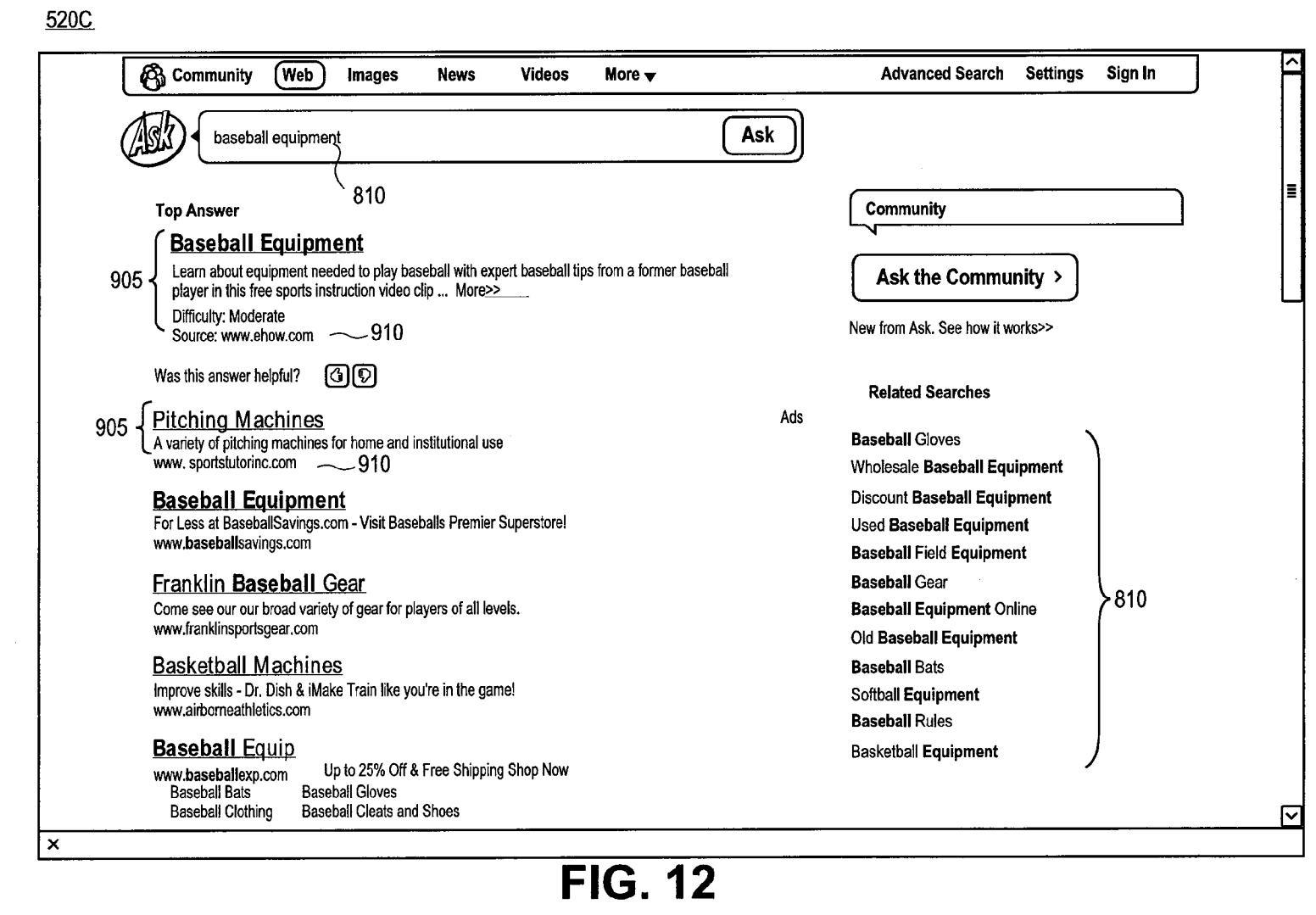

Another exemplary search interface 505B is depicted in FIG. 10, wherein the entered query 615 is "baseball." Exemplary results interface 515C is depicted in FIG. 11 may be generated by a search engine system, for example search engine system 14A, in response to received query 615. FIG. 12 depicts an exemplary answers page 520C provided by, for example, a second search engine system, such as second search engine system 14B, in response to receiving a selection of the suggestion provided on results interface 515C. Answers interface 520C provides a plurality of answers related to the selected suggestion "baseball equipment."

Figure 13:
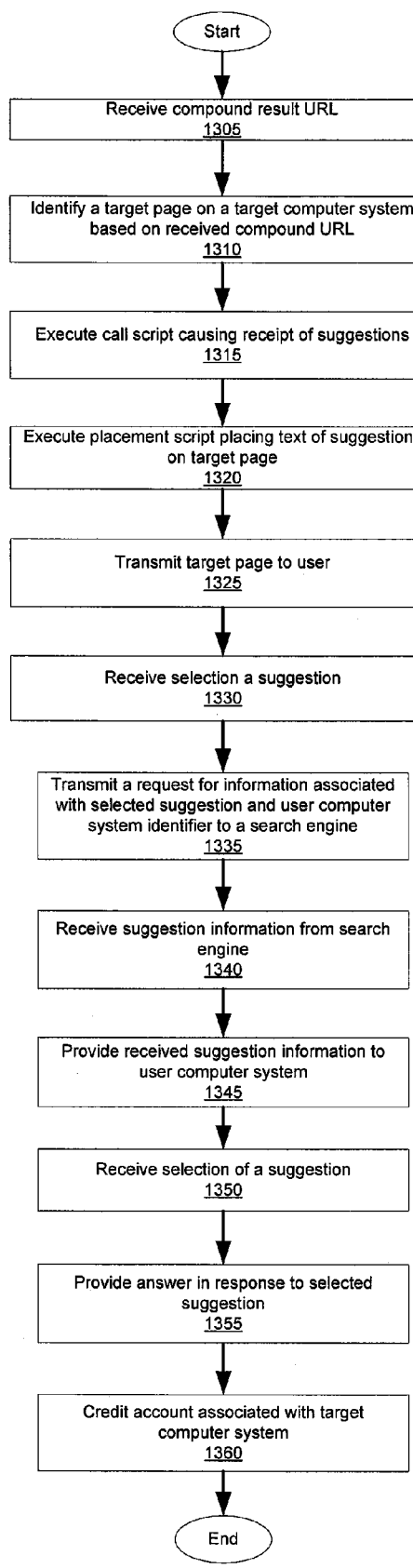
FIGS. 13 and 14 are flow charts depicts exemplary processes for answering a query, in accordance with embodiments of the present invention.

FIG. 13 is a flowchart illustrating an exemplary process 1300 for operating a target computer system to answer a query. Process 1300 may be executed by, for example, one or more of the systems or system components disclosed herein.

In step 1305, a compound result URL may be received at, for example, a target computer system, such as target computer system 32. An exemplary compound result URL may include a target page identifier and a query and may resemble compound result URL 715 as discussed above with reference to FIGS. 7A and 7B.

When the compound result URL is received, the target page identifier included therein may be used to, for example, identify a target page on the target computer system (step 1310). A call script may then be automatically executed by, for example, the target computer system and/or a user computer system (step 1315). The call script may include, for example, a request for one or more suggestions. In some cases, the call script may include a request for suggestions related to the query. The call script may be associated with, for example, a particular target page and/or the target computer. In some embodiments, the call script may be provided by, for example, a related search system, such as related search system 535 and/or second search engine system 14B, such that the related search system is utilized for providing the suggestions requested by the call script and subsequent answers to selected suggestions. Execution of the call script may, for example, cause receipt of a plurality of suggestions based on the query by the target computer system. The suggestions may include, for example, text of a suggestion, such as text of suggestion 810, and a compound suggestion URL, such as compound suggestion URL 815.

Next, in step 1320, a placement script may be automatically executed by, for example, the target computer system. Execution of the placement script may, for example, place the text of each suggestion and/or compound suggestion URL on the target page. In step 1325, the target page may be transmitted to a user. Exemplary target pages include results interface 510. The text of each suggestion included on the target page may have, for example, an associated suggestion URL Receipt of a selection of the text of the suggestion and/or a compound suggestion URL (step 1330) may cause, for example, redirection of the user computer based on the suggestion URL to, for example, the related search system and/or second search engine system. In some cases, a request for information associated with a selected suggestion and an identifier associated with a user computer selecting the suggestion may be transmitted to a search engine, such as the related search system and/or second search engine system (step 1335).

Next, in step 1340, suggestion information may be received from the search engine and provided to user computer (1345) upon, for example, a target page interface, such as target page interface 515. The suggestion information may include, for example text of the suggestion, such as text of suggestion 810 and/or a suggestion URL, such as compound suggestion URL 815. In one embodiment, a suggestion URL may include a compound suggestion URL that may, in turn, include, for example, a search engine identifier, such as second search system identifier 825, indicating a search engine system to receive the compound suggestion URL when selected by a user computer system.

In step 1350, a selection of a suggestion may be received. A search engine system, such as a search engine system indicated by the search engine identifier, may then extract a plurality of answers from a database communicatively coupled to the search engine in order to respond to the selected suggestion and provide them to the user computer system (step 1355).

Optionally, a user computer system identifier of the user computer system may then be transmitted to the search engine transmitting the answers to the user computer system associated with the user computer system identifier. In some cases, the compound suggestion URL may include a target computer system identifier of the target computer system for use by the search engine system to credit an account corresponding to the target computer system identifier (step 1360). Following steps 1360, process 1300 may end.

Figure 14:
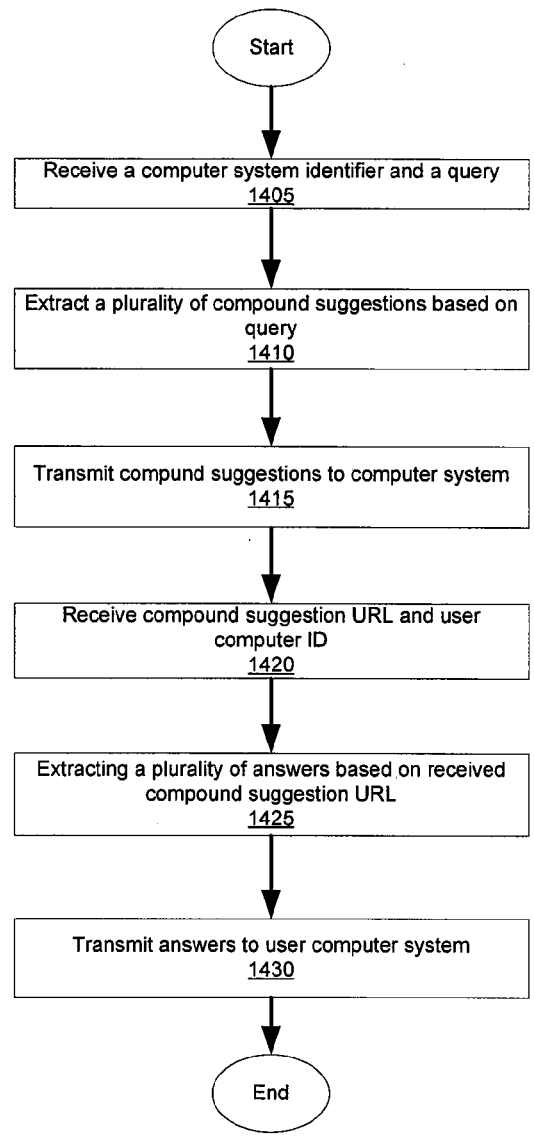

FIG. 14 is a flowchart illustrating an exemplary process 1400 for operating a search engine system. Process 1400 may be executed by, for example, one or more of the systems or system components disclosed herein.

In step 1405, a user computer system identifier and a query may be received at, for example, the search engine system from a user computer system. A plurality of compound suggestions may be extracted from a data store based on the query (step 1410). Each compound suggestion may include, for example text of a suggestion and a compound suggestion URL. The compound suggestion URL may include, for example, a search engine identifier of the search engine system. The compound suggestions may be transmitted from the search engine system to the user computer system associated with the user computer system identifier (step 1415).

One of the compound suggestion URLs and the user computer system identifier may be received by the search engine system from the user computer system following, for example, selection of the compound suggestion (step 1420). Selection of the compound suggestion may direct the user computer system to the search engine due to the search engine identifier included in the compound suggestion URL. The search engine may then use the compound suggestion URL to extract a plurality of answers from a data store (step 1425). The answers may then be transmitted to the user computer system (step 1430). Following step 1430, process 1400 may end.

Thus, systems, computer-readable media, and methods of operating a target computer system to answer a query have been herein disclosed.

What is claimed is:

1. A method of operating a target computer system comprising:
receiving a compound result URL at a target computer system, the compound result URL including a target page identifier and a query;
in response to receiving the compound result URL, utilizing the target page identifier to identify a target page on the target computer system;
automatically executing a call script causing receipt of a plurality of suggestions based on the query, each suggestion including a text of the suggestion and a suggestion URL;
automatically executing a placement script that places the text of each suggestion on the target page, the text of each suggestion having an associated suggestion URL so that selection of the text of the suggestion causes redirection of a user computer based on the suggestion URL, wherein each suggestion URL is a compound suggestion URL that includes a search engine identifier indicating a search engine system to receive the compound suggestion URL and the text of the suggestion enables the search engine system to extract a plurality of answers from a database communicatively coupled to the search engine; and
transmitting a user computer system identifier of the user computer system with the compound URL to the search engine transmitting the answers to the user computer system associated with the user computer system identifier, wherein the compound suggestion URL includes a target computer system identifier of the target computer system for use by the search engine system to credit an account corresponding to the target computer system identifier.

2. The method of claim 1, further comprising:
transmitting the target page from the target computer system to the user computer system.

3. The method of claim 2, wherein the target page is transmitted after execution of the placement script.

4. The method of claim 1, wherein the call script is executed by the user computer system.

5. A target computer system comprising:
a processor;
a storage medium connected to the processor;
a network interface device connected to the processor; and
a set of instructions on the storage medium and executable by the processor including:
a plurality of target pages;
a receiver that receives a compound URL over the network interface device, the compound URL including a target page identifier and a query;
a target page identifier that in response to receiving the content URL, utilizes the target page identifier to identify a target page among the plurality of target pages;
a call script that when executed automatically causes receipt of a plurality of suggestions based on the query, each suggestion including a text of the suggestion and a suggestion URL;
a placement script that places the text of each suggestion on the target page, the text of each suggestion having an associated suggestion URL so that selection of the text of the suggestion causes redirection of the user computer based on the suggestion URL; and
a transmitter that transmits the target page together with the text of the suggestions thereon and the suggestion URLs associated with the text of the suggestion over the network interface device to the user computer system, wherein each suggestion URL is a compound suggestion URL that includes a search engine identifier of a search engine system for transmitting the compound suggestion for well to the text of suggestion for use by the search engines system to extract a plurality of answers, wherein the transmitter transmits a user computer system identifier of the user computer system with the compound URL, the search engine transmitting the answers to the user computer system associated with the user computer system identifier, wherein the compound suggestion URL includes a target computer system identifier of the target computer system for use by the search engine system to credit an account corresponding to the target computer system identifier.

6. A computer-readable medium having stored thereon a set of instructions that are executable by a processor to carry out a method, the method comprising:
    receiving a compound result URL at a target computer system, the compound result URL including a target page identifier and a query;
    in response to receiving the compound result URL, utilizing the target page identifier to identify a target page on the target computer system;
    automatically executing a call script causing receipt of a plurality of suggestions based on the query, each suggestion including a text of the suggestion and a suggestion URL;
    automatically executing a placement script that places the text of each suggestion on the target page, the text of each suggestion having an associated suggestion URL so that selection of the text of the suggestion causes redirection of a user computer based on the suggestion URL, wherein each suggestion URL is a compound suggestion URL that includes a search engine identifier indicating a search engine system to receive the compound suggestion URL and the text of the suggestion enables the search engine system to extract a plurality of answers from a database communicatively coupled to the search engine; and
    transmitting a user computer system identifier of the user computer system with the compound URL to the search engine transmitting the answers to the user computer system associated with the user computer system identifier, wherein the compound suggestion URL includes a target computer system identifier of the target computer system for use by the search engine system to credit an account corresponding to the target computer system identifier.

7. The computer-readable medium of claim 6, the method further comprising:
    transmitting the target page from the target computer system to the user computer system.

8. The computer-readable medium of claim 7, wherein the target page is transmitted after execution of the placement script.

9. The computer-readable medium of claim 6, wherein the call script is executed by the user computer system.

* * * * *